United States Patent
Payne

(10) Patent No.: US 7,509,011 B2
(45) Date of Patent: Mar. 24, 2009

(54) HYBRID WAVEGUIDE

(75) Inventor: Jonathan N. Payne, San Jose, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 0 days.

(21) Appl. No.: 10/758,759

(22) Filed: Jan. 15, 2004

(65) Prior Publication Data

US 2005/0201681 A1    Sep. 15, 2005

(51) Int. Cl.
- G02B 6/10 (2006.01)
- G02B 6/26 (2006.01)
- G02B 6/32 (2006.01)
- G02B 6/42 (2006.01)

(52) U.S. Cl. .................... 385/129; 385/31; 385/32; 385/33; 385/35; 385/38; 385/50

(58) Field of Classification Search .......... 385/132, 385/31–33, 35, 38, 50, 129
See application file for complete search history.

(56) References Cited

U.S. PATENT DOCUMENTS

| | | |
|---|---|---|
| 3,832,028 A | 8/1974 | Kapron |
| 4,262,996 A | 4/1981 | Yao |
| 4,367,916 A | 1/1983 | Mottier et al. |
| 4,440,468 A | 4/1984 | Auracher et al. |
| 4,746,770 A | 5/1988 | McAvinney |
| 4,916,308 A | 4/1990 | Meadows |
| 5,136,682 A | 8/1992 | Moyer et al. |
| 5,332,690 A | 7/1994 | Cho et al. |
| 5,414,413 A | 5/1995 | Tamaru et al. |
| 5,432,877 A | 7/1995 | Sun et al. |
| 5,480,764 A | 1/1996 | Gal et al. |
| 5,540,612 A | 7/1996 | Mendez |
| 5,604,835 A * | 2/1997 | Nakamura et al. .......... 385/129 |

(Continued)

FOREIGN PATENT DOCUMENTS

CN    1260060 A    7/2000

(Continued)

OTHER PUBLICATIONS

International Search Report and Written Opinion for PCT Application PCT/US04/10297, mailed on Sep. 13, 2004.

(Continued)

*Primary Examiner*—Frank G Font
*Assistant Examiner*—Jerry Blevins
(74) *Attorney, Agent, or Firm*—Beyer Law Group LLP

(57) ABSTRACT

A waveguide system wherein a top cladding layer leaves portions of an underlying core channel exposed to ambient air. The ends of core channels are exposed so that light can exit out of or enter into each of the core channels. Openings are formed in the top cladding layer to expose a curved section of a core channel to the ambient air. The low index of refraction of the ambient air allows the curved section to have a reduced turn radius and thereby allows the waveguide system to have a smaller footprint. A via in the top cladding layer provides access to an underlying core channel so that optical communication with the underlying core can be established. An optical computer input device formed of waveguide systems having top cladding layers that leave portions of an underlying core channel exposed.

27 Claims, 5 Drawing Sheets

U.S. PATENT DOCUMENTS

| | | | |
|---|---|---|---|
| 5,719,973 | A | 2/1998 | Monroe et al. |
| 5,850,498 | A | 12/1998 | Shacklette et al. |
| 5,914,709 | A | 6/1999 | Graham et al. |
| 6,181,842 | B1 | 1/2001 | Francis et al. |
| 6,341,189 | B1 | 1/2002 | Deacon |
| 6,351,260 | B1 | 2/2002 | Graham et al. |
| 6,456,766 | B1 | 9/2002 | Shaw et al. |
| 6,470,130 | B1 | 10/2002 | Walker et al. |
| 6,491,443 | B1 | 12/2002 | Serizawa et al. |
| 6,538,644 | B1 | 3/2003 | Muraoka |
| 6,555,288 | B1 | 4/2003 | Xu et al. |
| 7,099,553 | B1 | 8/2006 | Graham et al. |
| 2002/0030668 | A1 | 3/2002 | Hoshino et al. |
| 2002/0118907 | A1* | 8/2002 | Sugama et al. ............ 385/14 |
| 2003/0035632 | A1 | 2/2003 | Glebov et al. |
| 2003/0174943 | A1 | 9/2003 | Caracci et al. |
| 2003/0203315 | A1 | 10/2003 | Farahi et al. |
| 2003/0231851 | A1 | 12/2003 | Rantala et al. |
| 2004/0017974 | A1 | 1/2004 | Balch et al. |
| 2004/0076382 | A1 | 4/2004 | Saia et al. |
| 2004/0247236 | A1 | 12/2004 | Yoshimura et al. |
| 2005/0089298 | A1 | 4/2005 | Maxwell et al. |
| 2005/0271983 | A1 | 12/2005 | Payne et al. |
| 2006/0001653 | A1 | 1/2006 | Smits |
| 2006/0002655 | A1 | 1/2006 | Smits |
| 2006/0088244 | A1 | 4/2006 | Kukulj et al. |
| 2006/0188196 | A1 | 8/2006 | Charters et al. |

FOREIGN PATENT DOCUMENTS

| | | |
|---|---|---|
| EP | 0569181 | 11/1993 |
| EP | 1271211 | 1/2003 |
| JP | 63-303308 | 12/1988 |
| JP | 200078349 | 3/2000 |
| JP | 2004125899 | 4/2004 |
| WO | WO03/025644 | 3/2003 |
| WO | WO2004/011974 | 2/2004 |

OTHER PUBLICATIONS

International Search Report and Written Opinion for PCT application PCT/US2005/019556, mailed on Aug. 29, 2005.
Chen, R. T. "Polymer-Based Photonic Integrated Circuits", Optics and Laser Technology, Elsevier Science Publishers BV, Amsterdam, NL, vol. 25, No. 6, Dec. 1, 1993, pp. 347-365.
Final Office Action in U.S. Appl. No. 11/734,631 mailed Mar. 17, 2008.
Office Action from Corresponding Chinese Application 200580024970.4, mailed Nov. 30, 2007.
Office Action from Corresponding Chinese Application 200580024976.1, mailed Nov. 30, 2007.
International Search Report from PCT/US07/80346 mailed on Mar. 4, 2008.
Written Opinion from PCT/US07/80346 mailed Mar. 4, 2008.
Office Action in Chinese patent application No. 2005800263928, mailed Mar. 7, 2008.
Office Action in U.S. Appl. No. 10/862,003, mailed Jun. 2, 2008.
Office Action in U.S. Appl. No. 10/817,564, mailed May 28, 2008.
International Search Report in PCT/US2004/017134, mailed May 26, 2008.
Written Opinion in PCT/US2007/017134, mailed May 26, 2008.
Paloczi et al. "Free-standing All-polymer Microring Resonator Optical Filter", Electronics Letters, IEE Stevebage, GB, vol. 39, No. 23, No. 13, 2003, pp. 1650-1651.
Office Action in U.S. Appl. No. 11/734,631, mailed Jul. 11, 2008.
Notice of Allowance in U.S. Appl. No. 10/861, 251, mailed Jun. 27, 2008.
Allowed Claims for U.S. Appl. No. 10/861,251.
Office Action in Chinese Application 200580024970.4, mailed Aug. 15, 2008.
Office Action from Chinese Application 200580024976.1, mailed Aug. 15, 2008.
U.S. Appl. No. 10/862,003, filed Jun. 4, 2004.
U.S. Appl. No. 10/817,564, filed Apr. 1, 2004.
U.S. Appl. No. 10/761,251, filed Jun. 4, 2004.
International Search Report and Written Opinion for related PCT application PCT/US2005/019560, mailed on Mar. 22, 2006.
International Search Report for corresponding PCT application PCT/US2005/019480, mailed on Nov. 22, 2005.
Office Action in U.S. Appl. No. 10/862,005, mailed Dec. 14, 2007.
Notice of Allowance in U.S. Appl. No. 11/542,816, mailed Dec. 11, 2007.
Allowed Claims from U.S. Appl. No. 11/542,816.
Office Aciton in U.S. Appl. No. 10/817,564, mailed Sep. 21, 2007.

* cited by examiner

HYBRID WAVEGUIDE

This application is related to U.S. Pat. No. 6,181,842 to Francis et al. entitled "Position Digitizer Waveguide Array with Integrated Collimating Optics," the content of which is hereby incorporated by reference.

FIELD OF THE INVENTION

The present invention relates generally to waveguide systems, and more specifically to cladding designs within waveguide systems.

BACKGROUND OF THE INVENTION

A waveguide system provides a medium through which electromagnetic waves are transmitted. For instance, an optical waveguide system transmits optical waves. The two most common types of optical waveguides are rib-form waveguides and buried-channel waveguides.

A rib-form optical waveguide system is typically formed by providing multiple core channels, each of which transmit optical signals, on top of a cladding layer that has a relatively lower index of refraction, IOR. Above the cladding layer, the core is exposed to ambient air that forms an "air cladding." Air also has a lower index of refraction compared to that of the core ($IOR_{air}$ approximately equals 1). Parallel arrangement of these exposed channels lend to the name "rib-form" waveguides. Light can be guided through the core since the index of refraction of the core is relatively higher than that of the surrounding claddings. The very low index of refraction of the air cladding allows the waveguide system to effectively guide light through bends or curves without excessive lost of light. One disadvantage, however, is that the air cladding can leave the core channels exposed to physical damage and contamination from dust and other types of contaminants.

When waveguide systems include an additional cladding layer to sandwich the core channels between the two cladding layers, the waveguide system is commonly referred to as a buried-channel waveguide system. The buried channel waveguide system is more structurally sound since the channels are completely covered (or "buried") and thereby protected by the additional cladding layer. Unfortunately, the index of refraction of the additional cladding layer is typically higher than that of air. This means that buried-channel waveguide systems are less able to guide light through curves without losing a large amount of light through each turn. To avoid excessive loss of light, the core channels must be formed such that the turns have larger turn radii. Unfortunately, this causes waveguide systems to occupy a larger footprint in systems that typically put a premium on maintaining small form factors.

In light of the constant miniaturization of computing systems and the increased use of optical transmission systems, waveguide systems that have smaller form factors and that are able to endure physical handling during manufacturing processes would be desirable.

BRIEF SUMMARY OF THE INVENTION

The present invention is directed to a waveguide system wherein a top cladding layer is formed to leave portions of an underlying core channel exposed to the ambient air. The top cladding layer is formed to expose end portions of each core channel, a curved section of a core channel, and/or another selected section of a core channel for optical communication and sensory applications.

One aspect of the present invention pertains to a waveguide system that includes a support substrate, a bottom cladding layer formed on top of the support substrate, a plurality of core channels suitable for optical transmission formed on top of the bottom cladding layer, and a top cladding layer formed on top of both the bottom cladding layer and the core channels such that the core channels are sandwiched between the bottom and the top cladding layer. The top cladding layer leaves the ends of at least some of the core channels exposed to ambient air whereby light can exit out of the ends of the core channels. In an alternative embodiment of the waveguide system, the top cladding layer has at least one access via that exposes a core channel to the ambient air, whereby the access via provides access for optical communication with the exposed core channel.

Another aspect of the invention pertains to a waveguide system that includes a support substrate, a bottom cladding formed on top of the support substrate, a plurality of core channels wherein at least some of the core channels have a curved section wherein a lengthwise portion of a respective core channel follows a curved path, and a selectively patterned top cladding layer formed on top of both the bottom cladding layer and the core channels such that the core channels are sandwiched between the bottom and the top cladding layer. The top cladding is selectively pattered to have at least one curve opening that exposes the curved section of a respective core channel to the ambient air so that a radius of the curved section is smaller than when the top cladding layer covers the curved section.

Yet another aspect of the invention pertains to an apparatus that includes a light source, a multi-channel transmission waveguide optically coupled to receive light from the light source, the transmission waveguide producing a set of light beams by guiding the light received from the light source so that the set of light beams emanate from the transmission waveguide in a first direction, a multi-channel reception waveguide spaced apart from the transmission waveguide in the first direction, the reception waveguide receiving the set of light beams emanating from the transmission waveguide, and a light detector optically coupled to the reception waveguide to receive the light from the reception waveguide, the light detector including a plurality of light detecting elements that substantially simultaneously detects light intensity of the light from the reception waveguide. The transmission waveguide and the reception waveguide are each formed of at least a support substrate, a bottom cladding layer formed on top of the support substrate, a plurality of core channels suitable for optical transmission formed on top of the bottom cladding layer, and a top cladding layer formed on top of both the bottom cladding layer and the core channels such that the core channels are sandwiched between the bottom and the top cladding layer. The top cladding layer leaves an end of at least some of the core channels exposed to ambient air whereby the light beams can enter into or exit out of the ends of the core channels.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The invention pertains to a waveguide system wherein a top cladding layer is formed to leave portions of an underlying core channel exposed to the ambient air. In one embodiment, the ends of core channels are exposed so that light can exit out of or enter into each of the core channels. In another embodiment, openings are formed in the top cladding layer to expose a curved section of a core channel to the ambient air. The low index of refraction of the ambient air allows the curved section to have a reduced turn radius and thereby allows the waveguide system to reduce its footprint. In yet another embodiment, a via in the top cladding layer provides access to an underlying core channel so that optical communication with the underlying core can be established.

Figure 1:
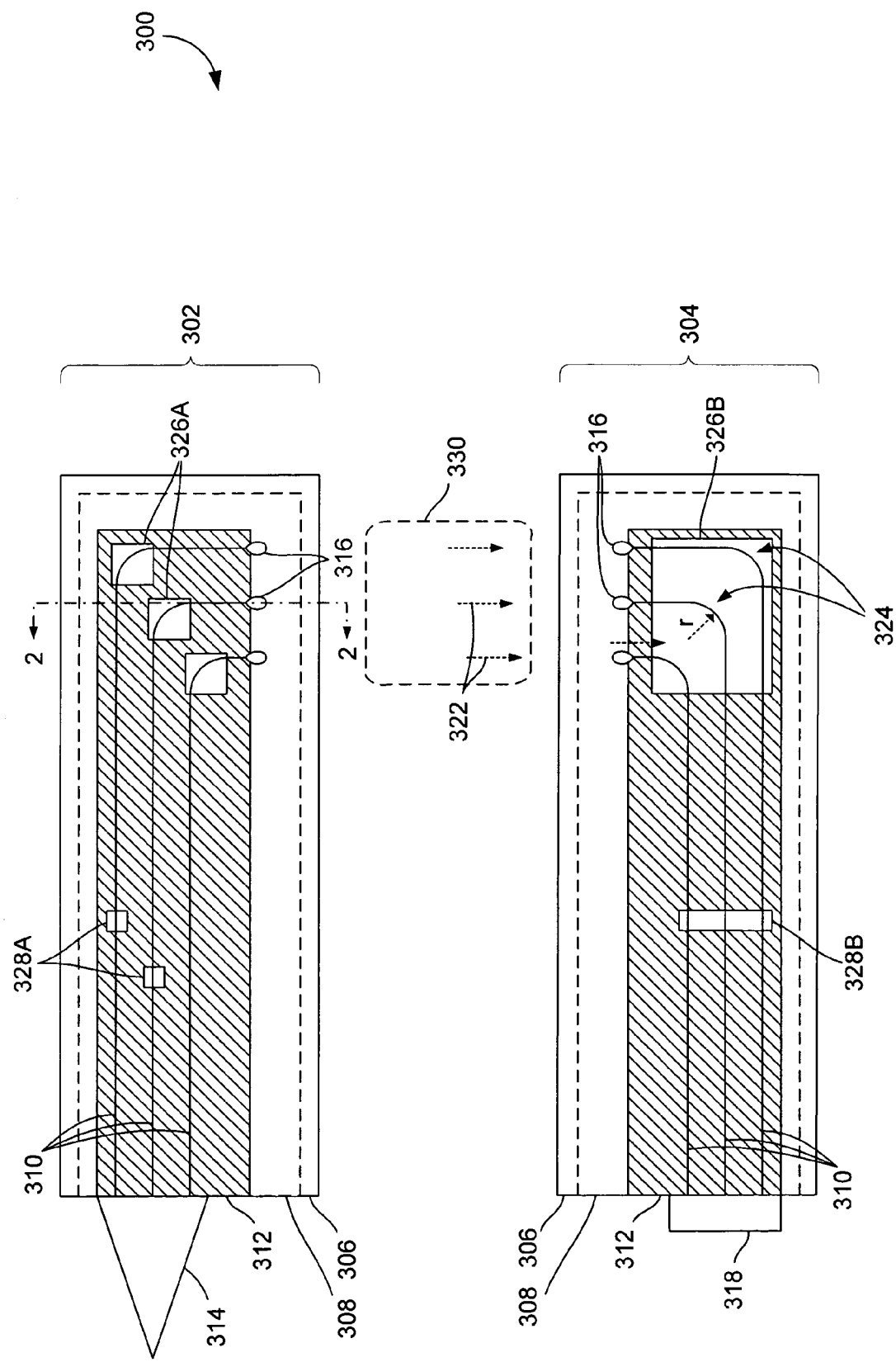
FIG. 1 illustrates a top plan view of a waveguide system according to one embodiment of the present invention.
Figure 2:
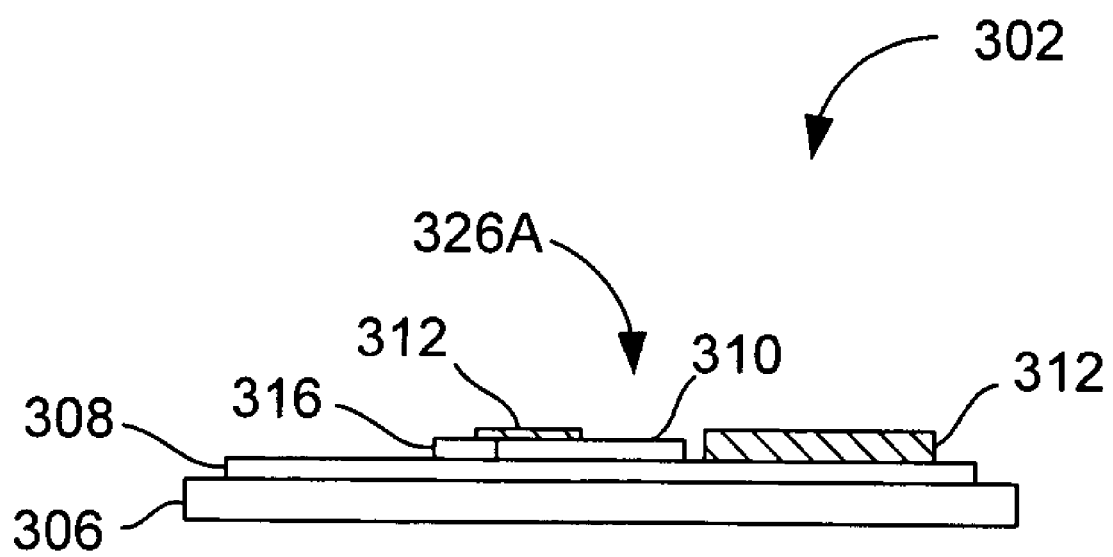
FIG. 2 illustrates a side plan, cross-sectional view of the transmission waveguide of FIG. 1, along line 2-2.

FIG. 1 illustrates a top plan view of a waveguide system 300 according to one embodiment of the present invention. Waveguide system 300 includes a transmission waveguide 302 and a reception waveguide 304. FIG. 2 illustrates a side plan, cross-sectional view of transmission waveguide 302 along line 2-2, as shown in FIG. 1. Each of transmission waveguide 302 and reception waveguide 304 are formed of a support substrate 306, a bottom cladding layer 308, multiple core channels 310, and a top cladding layer 312. Within transmission waveguide 302, a light source 314 is connected to one end of the core channels 310 and optical lenses 316 are formed at the opposite ends of each of the core channels 310. Within reception waveguide 304, a light detector 318 is connected to one end of core channels 310. The opposite ends of each core channel 310 from light detector 318 also have optical lenses 316. Light source 314 produces light that is transmitted through each of the core channels 310 so that the light exits the opposite ends of the core channels 310 of transmission waveguide 302, then the light gets collimated into light beams 322 by passing through optical lenses 316, and then light beams 322 travel towards reception waveguide 304 across an open space. Each light beam 322 is collected into a respective core channel 310 of reception waveguide 304. Each of the core channels 310 then guides the light into light detector 318. Waveguide system 300 can be used for various purposes such as an input device for a computing system or as an optical signal transmission system. Further description regarding use of waveguide system 300 as an input device will be described below with respect to FIGS. 3-5.

But first the structure of waveguide system 300 will be described in further detail. Support substrate 306 is a layer of material suitable for supporting the materials that form the transmission and reception waveguides 302 and 304. Support substrate 306 should be able to withstand physical handling during manufacturing processes. For example, waveguides 302 and 304 will be physically handled to incorporate them into, for example, a computer system. Substrates 306 should also withstand manufacturing processes for creating waveguides 302 and 304. Materials appropriate for forming the support substrate tend to have a low thermal coefficient of expansion, a low water absorption tendency, a tendency to adhere to cladding layers, and low cost. Suitable substrate materials include glass, plastics, and ceramics.

Bottom cladding layer 308 is formed on top of support substrate 306 to provide a material that will support each core channel 310. Bottom cladding layer 308 has an inherent index of refraction that is typically less than the index of refraction of the core channels 310. This relationship in index of refraction values allows core channels 310 to effectively guide light through waveguides 302 and 304. Bottom cladding layer 308 is typically a very thin and clear layer that is difficult to discern from support substrate 310.

Core channels 310 are lengthwise pathways through which light can be transmitted. Core channels 310 are formed on top of bottom cladding layer 308 and can follow various paths depending upon where the light within each channel is to be guided. As can be seen in FIG. 1, core channels 310 have curved sections 324 wherein each core channel 310 follows a turn of approximately 90 degrees. The number of curved sections and the angle through which a curved section bends can vary for each core channel 310 depending upon the design requirements of each waveguide system. Each curved section 324 has a respective turn radius, r. Core channels 310 can be formed of various materials including polymers. The cross-section of each core channel 310 can be rectangular, circular or elliptical in shape.

Top cladding layer 312 is formed over both bottom cladding layer 308 and core channels 310. Top cladding layer 312 protects core channels 310 from physical harm during handling, manufacturing, and use. For instance, top cladding layer 312 can prevent core channels 310 from being wiped off of the surface of bottom cladding layer 308. Top cladding layer 312 also protects core channels from contaminants such as dust and moisture. Top cladding layer 312 typically has an index of refraction that is less than that of core channels 310. Top cladding layers 312 therefore also assist core channels 310 in guiding light throughout their pathways.

Top cladding layer 312 is formed such that optical lenses 316 are left exposed to the ambient air. Top cladding layer 312 has openings 326A, 326B, 328A, and 328B that expose selected portions of core channels 310. Openings 326A and 326B are referred to as turn openings since these openings expose curved sections 324 of core channels 310 in each of transmitting waveguide 302 and receiving waveguide 304. Openings 328A and 328B are referred to as access vias 328A and 328B since they provide access to one or more core channels 310 underneath top cladding layer 312. Openings 326A, 326B, 328A, and 328B expose sections of core channels 310 of each waveguide 302 and 304 to the ambient air. Since optical lenses 316 are left uncovered by top cladding layer 312, light is not blocked from being transmitted into and out of optical lenses 316. In this way, light beams 322 are free to travel from transmitting waveguide 302 to receiving waveguide 304. In some embodiments, the ends of core channels 310 that are connected to optical lenses 316 are also left uncovered by top cladding layer 312. It should be understood that edges of top cladding layer 312 can have various outlines or patterns in order to expose optical lenses 316 that are set at varying locations upon bottom cladding 308.

Turn openings 326A of transmitting waveguide 302 each expose a single turn section 324, while turn opening 326B is larger and thereby exposes multiple turn sections 324. Turn opening 326A and 326B can have various outline shapes. For instance, turn openings 326A and 326B can have more conforming shapes that follow the path of the curved section of each of core channels 310. In other words, the openings can also have a curved shape that is large enough to expose curved sections 324 of core channels 310 while minimizing the exposure of the underlying bottom cladding 308 to ambient air.

As is known in the art of waveguides, cladding layers are formed around core materials so that light can be guided through the core materials. Specifically, claddings having lower indexes of refraction than that of the core allow light to be guided through the core. Generally, larger differences in the index of refraction between that of the core and the claddings allow light to be more efficiently guided through the core. This is important when the core follows a curved pathway where it is more likely to lose light. In this respect, curve openings 326A and 326B are advantageous in that the ambient air serves as an "air cladding" over core channels 310. Air has an index of refraction that is approximately equal to 1, which is typically less than the index of refraction of cladding layer materials. Since curve openings 326A and 326B expose curve sections 324 of core channels 310 to the ambient air, core channels 310 can complete their respective turns with a smaller radius, r. Smaller radii, r, allow core channels 310 to occupy less space and thereby allow waveguides 302 and 304 to occupy a smaller footprint. This advantageously allows waveguides of the present invention to be utilized in smaller devices. In the present invention, the index of refraction of the core channels 301 should be at least approximately 0.3 greater than the index of refraction of the surrounding claddings, i.e., that of bottom cladding layer 308 and the ambient air.

Access vias 328A and 328B provide access to core channels 310 so that a separate optical transmission medium or optical device can be placed in optical communication with the core channels 310. Each access via 328A exposes and provides access to a single core channel 310, while each access via 328B exposes and provides access to multiple core channels 310.

Note that the top cladding layers 312 described in FIGS. 1 and 2 can be used in waveguides of various configurations and waveguides used for a variety of purposes. For instance, each of the aspects of leaving ends of core channels 310 exposed, utilizing curve openings, and utilizing access vias can be implemented independently or in various combinations with each other. For example, curve openings 326A and 326B can be used in top claddings that do not expose the ends of core channels 310 or that do not expose a separate section of core channels 310 for purposes of optical communication. Curve openings 326A and 326B can be used in various waveguides in which it is desirable to minimize the radius of a curved section of a core channel. This can aid a waveguide to fit into a small form factor. On the other hand, access vias 328A and 328B can be used in various waveguides in which it is desirable to gain an additional input or output pathway for optical signal transmission with a core channel. Finally, a top cladding can be formed in waveguides in situations in which it is desirable to allow light to exit out of or enter into a core channel within a waveguide.

Materials appropriate for forming bottom and top cladding layers 308 and 312, respectively, tend to have a lower index of refraction than that of core channels, optical clarity, tendency to adhere to support substrates and core channels, are capable of being applied as a coating or grown as a thin film, have low thermal coefficient of expansion, low water absorption, and low cost.

Waveguides and lenses can be formed integrally as a single structure. Alternatively, waveguides and lenses can be formed separately while being attached to each other. One technique for forming waveguides, lenses, or integrated waveguides and lenses involves a photolithographic process of applying a clear photosensitive and/or photo-curing polymer material, selectively exposing or underexposing the photosensitive polymer material to light, chemically "developing" the exposed or underexposed regions, rinsing and then drying the remaining photosensitive polymer material to yield a patterned waveguide. Other suitable materials are optically clear glass and inorganic materials that are patterned through photolithographic and/or micro-lithographic industrial processes.

Where waveguides and lenses are formed separately from each other, optical lenses 316 can be made out of plastic that is deposited in liquid form. The liquid plastic then cures into an optical lens capable of collimating the light from core channels 310. In such processes, optical lenses 316 are formed directly at the ends of core channels 310. In alternative embodiments, optical lenses 316 can be formed at a short distance separated from the ends of core channels 310. Note that optical lenses 316 are not necessary in all embodiments of transmission waveguides 302.

Light detector 318 is a device capable of determining the intensity of light received from each of core channels 310 of reception waveguide 304. For instance, light detector 318 can be a CMOS camera chip.

As mentioned above waveguides described in the present invention can be used for a variety of purposes. One of the possible uses of the waveguides described in this invention is to create a computer input device. In addition to illustrating the specific aspects of top cladding 312, FIG. 1 also illustrates a general configuration of waveguides 302 and 304 such that waveguide system 300 forms a computer input system according to an embodiment of the invention. As described above, light from light source 314 is guided through core channels 310 of waveguide 302 into a plurality of light beams 322 that are transmitted from transmission waveguide 302 into reception waveguide 304. Light beams 322 are directed across a transmission media 330, such as a computer monitor or a display of a handheld computing device. Light detector 318 then determines whether each of the light beams 322 that light detector 318 receives is "on" or "off" based on an intensity level of the received light for each of the light beams 322.

Those of the light beams 322 that are blocked (e.g., by user input) while being directed across the transmission media 330 are identified as "off" light beams by the light detector 318. A user's finger (touch input) or a stylus (pen-based input) blocks one or more of the light beams 322 from reaching both the reception waveguide 304 and light detector 318. The particular one or more of the light beams 322 being blocked thus provides a position of the user's input with respect to the light beams 322 that preferably have a predetermined relative location with respect to the transmission media 330. Consequently, the one or more light beams 322 that the light detector 318 determines to be "off" indicates the position of the user's input. For more detailed description of such an input system, refer to U.S. Pat. No. 5,914,709 to Graham et al., which is incorporated herein for all purposes. Also refer to U.S. Pat. No. 6,351,260 to Graham et al., which is a continuation of U.S. Pat. No. 5,914,709. U.S. Pat. No. 6,351,260 is also incorporated herein for all purposes.

Top cladding layer 312 of the present invention allows light to be transmitted out of and enter into core channels 310 since it does not cover optical lenses 316. This, of course, allows light beams 322 to travel across transmission medium 330, which is typically air. Curve openings 326A and 326B also allow waveguides 302 and 304 to be manufactured to a small form factor. This is advantageous when waveguide system 300 is to be incorporated as a user input device in small computer devices such as mobile telephones, personal digital assistants, and the like.

Figure 3:
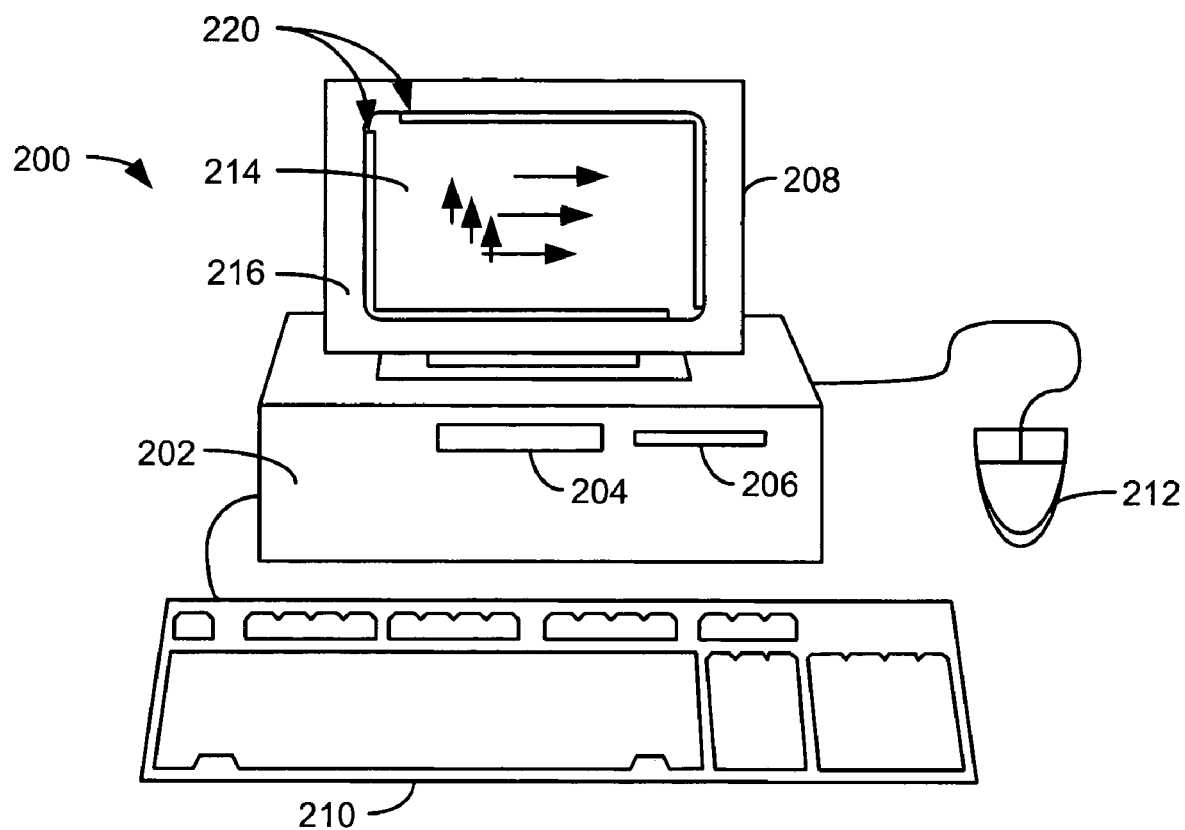
FIG. 3 illustrates a representative computer system suitable for hosting a waveguide system according to the invention wherein the waveguide system serves as an input device.

FIG. 3 illustrates a representative computer system 200 suitable for hosting a waveguide system according to the invention wherein the waveguide system serves as an input device 220. Computer system 200 includes a computer housing 202 having a CD-ROM drive 204 and a floppy drive 206. The computer system 200 also includes a display device 208, a keyboard 210 and a pointing device (e.g., mouse) 212. Input device 220 is attached to a screen area 214 of display device 208 so that a user can sent input signals into computer system 200 by interacting with screen area 214. Computer system 200 illustrated in FIG. 3 is a desktop computer system in which the display device 208 is normally a separate article of manufacture that couples to the computer housing 202 through a cable (not shown). The keyboard 210 and the pointing device 212 of the computer system 200 enable a user to provide user input to the computer system 200. As mentioned above, input device 220 as described in this disclosure can be utilized in various computer monitors, displays, or handheld computing devices, in addition to computer system 200.

Figure 4:
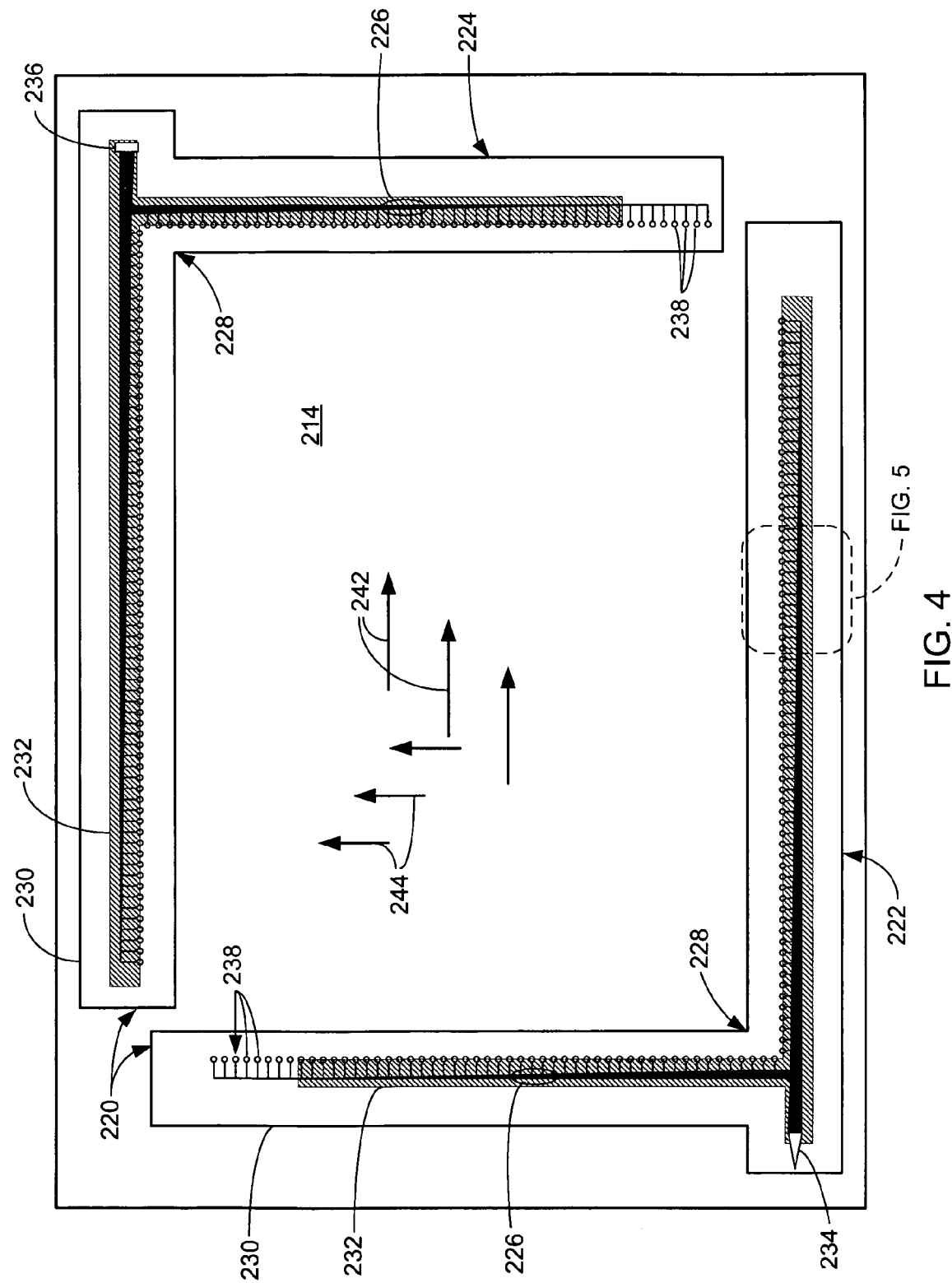
FIG. 4 illustrates an enlarged view of the screen area of FIG. 3 with the attached input device, which includes a transmission waveguide and a reception waveguide.

FIG. 4 illustrates an enlarged view of screen area 214 with attached input device 220 that includes a transmission waveguide 220 and a reception waveguide 222. Input device 220 affixes to the outer perimeter of screen area 214. In some embodiments, input device 220 does not extend over or block screen area 214. Alternatively, the input device could be made integral with the display device 208.

Input device 220 includes a transmission waveguide 222 and a reception waveguide 224, which are similar to transmission waveguide 302 and reception waveguide 304 of FIG. 1, respectively. Each of transmission waveguide 222 and reception waveguide 224 are L-shaped and are formed with a support substrate 230, a bottom cladding layer, core channels 226, and a top cladding layer 232. The bottom cladding layer is a clear material layer formed on top of support substrate 230 and therefore is not separately shown or designated in FIG. 4. A light source 234 and a light detector 236 are attached to the ends of core channels 226 in the region of the intersection 228 of each "L" shaped waveguide.

Core channels 226 in each of waveguides 222 and 224 are formed such that a set of core channels 226 run from the intersection 228 of each "L" and travel along each stem of the "L" shape. Along each stem, each core channel 226 is formed to curve towards the interior of screen area 214. As each stem of the waveguides 222 and 224 extend away from the intersection 228 of the "L" shape, the number of core channels 226 reduce in number until the last core channel 226 makes its turn and faces the interior of screen area 214.

Optical lenses 238 are formed on the ends of each core channel 226 in transmission waveguide 222 and reception waveguide 224.

Figure 5:
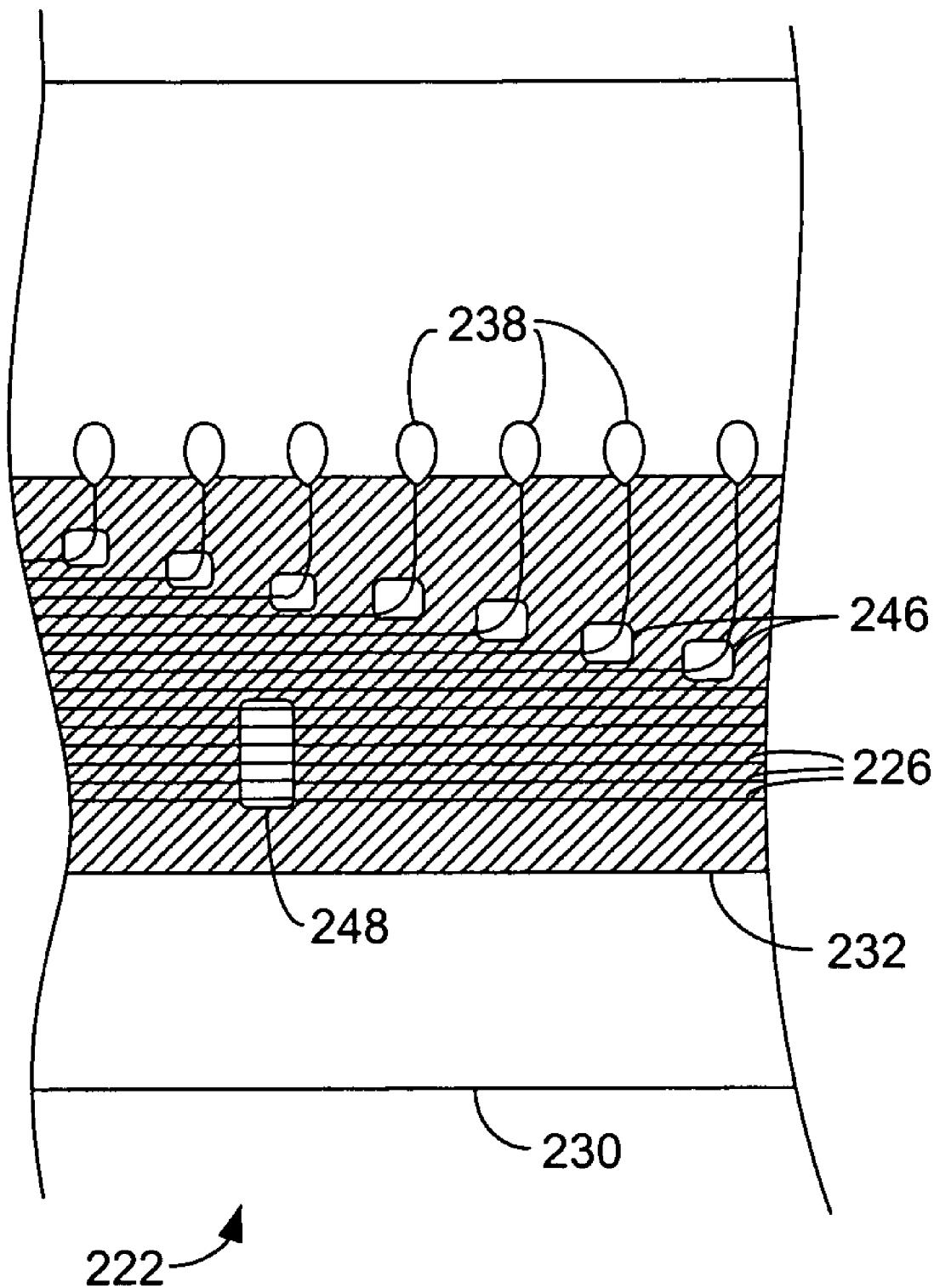
FIG. 5 illustrates an enlarged view of a fragment of the waveguide of FIG. 4.

FIG. 5 illustrates an enlarged view of a fragment of waveguide 222 of FIG. 4. As seen in FIG. 5, core channels 226 run parallel to each other and one-by-one turn towards the interior of screen display 214. The edge of top cladding layer 232 is positioned to leave optical lenses 238 exposed to the ambient air. FIG. 5 shows that top cladding layer 232 contains turn openings 246 and an access via 248, which are not discernable in FIG. 4. Turn openings 246 expose core channels 226 to the ambient air and thereby allow core channels 226 to complete their turns with a smaller turn radius. This advantageously allows waveguides 222 and 224 to be formed at a small scale and thereby become more easily integrated into small screen areas. Curve openings 238 and access vias 240 are formed within the top cladding layers 232 of one or both of waveguides 222 and 224. In some embodiments, curve openings 246 and access vias 248 are created for only a subset of core channels 310.

As seen in FIG. 4, top cladding layers 232 are formed to leave an entire section of core channels 226 exposed to the ambient air. In alternative embodiments, top cladding layer 232 extends to the end of core channels 226.

Light source 234 produces light that is guided through core channels 226 of transmission waveguide 222 until they are collimated by optical lenses 238. The light then leaves waveguide 222 along each the x and y axes as light beams 242 and 244, respectively. Light beams 242 and 244 travel across screen area 214 and enter core channels 226 of reception waveguide 224. Reception waveguide 224 then guides each light beam through a respective core channel 226 for detection by light detector 236. The plurality of core channel pairs that send and receive respective light beams form a grid of light beams across screen display 214. Most of screen area 214 is covered by the grid of light beams, however in alternative embodiments, a smaller portion useful for receiving use input can be covered by a light grid. In other embodiments, entire screen area 214 can be covered with a light beam grid.

As described above, when an object such as a user's finger or a stylus blocks any of light beams 242 and 244, light detector 236 can determine the core channels 226 within which light is not being received. A processor can then determine the location upon screen area 214 that the user touched and the input the user intended to provide.

Although an input device according to the invention is preferably placed over or integral with a display screen, it should be recognized that an input device according to the invention can also be placed over surfaces other than display screens. For example, the input device could surround a pad, board or tablet for pen or touch input. The input device could also be used in various environments other than for user input to computer systems. For example, the input device could be used for robotics positioning where the input device provides robotic positioning information. As another example, the input device could be used with a safety or emergency sensor where interruption of the light beam operates as a switch.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. A waveguide system comprising:
   a bottom cladding layer;

a plurality of core channels suitable for optical transmission extending along the a top surface of the bottom cladding layer, wherein at least some of the core channels have a curved section formed so that a bottom surface of the core channel lies on the top surface of the bottom cladding layer;

a patterned top cladding layer formed on top of both the bottom cladding layer and the core channels such that the core channels are sandwiched between the bottom and the top cladding layer and wherein the patterned top cladding layer has at least one opening that exposes the curved section of the core channel to the ambient air enabling a radius of the curved section to be smaller than when the top cladding layer covers the curved section; and a plurality of optical lenses formed on the bottom cladding layer and positioned in the optical path of the ends of the plurality of the core channels respectively, wherein the patterned top cladding layer is patterned so that a substantial portion of each of the plurality of optical lenses are exposed to ambient air respectively.

2. A waveguide system as recited in claim 1 wherein each of the plurality of optical lenses are spaced from the ends of the core channels so that the ambient air is provided between the ends of the core channels and the plurality of optical lenses respectively.

3. A waveguide system as recited in claim 1 wherein the curved section of at least some of the core channels are configured to include a straight portion on either end of the curved section, and wherein said at least one opening in the patterned top cladding layer exposes the curved section and at least some of the straight portion of the core channel to the ambient air.

4. A waveguide system as recited in claim 3 wherein the index of refraction of the core channels is at least approximately 0.3 greater than the index of refraction of the bottom cladding layer and of the ambient air, respectively.

5. A waveguide system as recited in claim 3 wherein the curve opening exposes a curved section of more than one core channel.

6. A waveguide system as recited in claim 3 wherein the shape of the opening conforms to the curved path of the curved section of a respective core channel.

7. A waveguide system as recited in claim 3 wherein the curved path of the curved section of a respective core channel follows a turn of approximately 90 degrees or more.

8. A waveguide system as recited in claim 1 wherein the patterned top cladding layer has at least one access via that exposes a core channel to the ambient air, whereby the access via provides access for optical communication with the exposed core channel.

9. A waveguide system as recited in claim 8 further comprising an external optical device placed proximate to the access via such that the external optical device is in optical communication with the exposed core channel.

10. A waveguide system as recited in claim 8 wherein the access via exposes a plurality of core channels to the ambient air, whereby the access via provides access for optical communication with the exposed core channels.

11. A waveguide system as recited in claim 1 wherein the core channels are formed of a polymer material.

12. The waveguide system of claim 1 wherein the at least one opening in the selectively patterned top cladding layer exposes the entire curved section of the core channel to the ambient air.

13. A waveguide system comprising:
a bottom cladding layer;
a core channel formed on a top surface of the bottom cladding layer, the core channel having a curved section which follows a curved path on the bottom cladding layer; and a selectively patterned top cladding layer formed on top of both the bottom cladding layer and the core channel such that the core channel is sandwiched between the bottom and the top cladding layer, wherein the top cladding is selectively pattered to have at least one opening that exposes the curved section of the core channel to the ambient air so that a radius of the curved section is smaller than otherwise possible if the top cladding layer covered the curved section.

14. A waveguide system as recited in claim 13 wherein the index of refraction of the core channels is at least approximately 0.3 greater than the index of refraction of the bottom cladding layer and of the ambient air, respectively.

15. A waveguide system as recited in claim 13 wherein the opening exposes a curved section of more than one core channel.

16. A waveguide system as recited in claim 13 wherein the curved path of the curved section of the core channel follows a turn of approximately 90 degrees or more.

17. A waveguide system as recited in claim 13 wherein the top cladding layer has at least one access via that exposes a core channel to the ambient air, whereby the access via provides access for optical communication with the exposed core channel.

18. A waveguide system as recited in claim 17 further comprising an external optical device placed proximate to the access via such that the external optical device is in optical communication with the exposed core channel.

19. The waveguide system of claim 13 wherein the at least one opening in the top cladding layer exposes the entire curved section of the core channel to the ambient air.

20. An apparatus, comprising:
a light source;
a multi-channel transmission waveguide optically coupled to receive light from the light source, the transmission waveguide producing a set of light beams by guiding the light received from the light source so that the set of light beams emanate from the transmission waveguide in a first direction;
a multi-channel reception waveguide spaced apart from the transmission waveguide in the first direction, the reception waveguide receiving the set of light beams emanating from the transmission waveguide;
wherein the transmission waveguide and the reception waveguide are each formed of at least,
a bottom cladding layer;
a plurality of core channels suitable for optical transmission formed on top of the bottom cladding layer, each of the core channels having a first end and a second end and a curved portion arranged therebetween, the curved portion being formed so that a bottom of the curved portion is formed on the top of the bottom cladding layer; and
a patterned top cladding layer formed on top of both the bottom cladding layer and the core channels such that the core channels are sandwiched between the bottom and the patterned top cladding layer and wherein the patterned top cladding layer has at least one opening that exposes at least one curved portion of the core channel to the ambient air enabling a radius of the curved section to be smaller than when the top cladding layer covers the curved portion;
a plurality of optical lenses formed on the bottom cladding layer and positioned in the optical path of the ends of the plurality of the core channels respectively, wherein the patterned top cladding is patterned so that at substantial portion of each of the plurality of optical lenses are exposed to ambient air; and a light detector optically coupled to the reception waveguide to receive the light from the reception waveguide, the light detector including a plurality of light detecting elements that detect light intensity of the light from the reception waveguide.

21. An apparatus as recited in claim 20 wherein the apparatus is an input device for an electronic device, and wherein an input area is produced between the transmission waveguide and the reception waveguide.

22. An apparatus as recited in claim 20 wherein at least some of the core channels of the transmission waveguide and the reception waveguide have a curved section wherein a lengthwise portion of a respective core channel follows a curved path, and wherein the patterned top cladding layer has at least one opening that exposes the curved section of the core channel to the ambient air.

23. An apparatus as recited in claim 22 wherein the index of refraction of the core channels is at least approximately 0.3 greater than the index of refraction of the bottom cladding layer and of the ambient air, respectively.

24. An apparatus as recited in claim 22 wherein the curved path of the curved section of a respective core channel follows a turn of approximately 90 degrees or more.

25. An apparatus as recited in claim 20 wherein the patterned top cladding layer of each of the transmission waveguide and the reception waveguide has at least one access via that exposes a core channel to the ambient air, whereby the access via provides access for optical communication with the exposed core channel.

26. An apparatus as recited in claim 25 further comprising an external optical device placed proximate to the access via of each of the transmission waveguide and the reception waveguide such that the external optical devices are in optical communication with the respective exposed core channels.

27. A waveguide system comprising:
a bottom cladding layer;
a core channel having a curved section which follows a curved path on a top surface of the bottom cladding layer, said curved path having a radius; and
a selectively patterned top cladding layer formed on top of both the bottom cladding layer and the core channel such that the core channel is sandwiched between the bottom and the top cladding layer, wherein the top cladding is selectively pattered to have at least one opening that exposes the entire curved section of the core channel to the ambient air so that the radius of the curved section is smaller than otherwise possible if the top cladding layer covered the curved section.

* * * * *